Figure 1A:
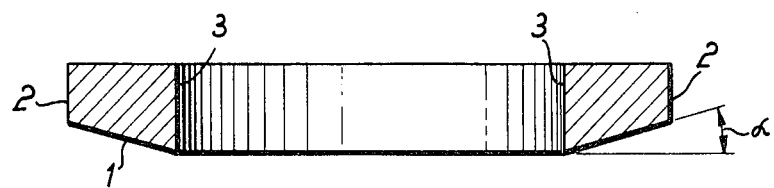
Figure 1B:
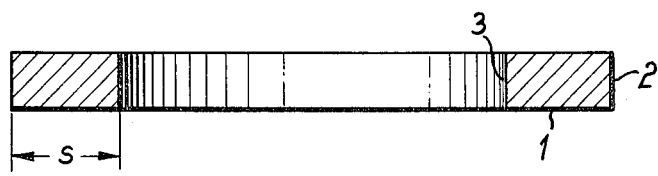
Figure 1C:
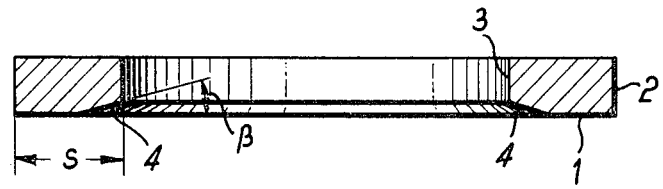
Figure 1D:
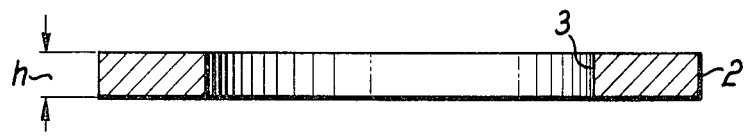

United States Patent

[11] 3,618,960

| [72] | Inventor | Max Koehler<br>Holkenstr. 25, 5813 Wetter-Wengern,<br>Germany |
|------|----------|---|
| [21] | Appl. No. | 46,617 |
| [22] | Filed | June 16, 1970 |
| [23] | | Division of Ser. No. 673,340,<br>Oct. 6, 1967, Pat. No. 3,561,087 |
| [45] | Patented | Nov. 9, 1971 |
| [32] | Priority | Oct. 10, 1966 |
| [33] | | Germany |
| [31] | | K 60 420 |

[54] PISTON RING
4 Claims, 4 Drawing Figs.

[52] U.S. Cl. ................................................... 277/216,
227/236 R
[51] Int. Cl. ...................................................... F16j 9/00

[50] Field of Search ........................................ 277/216–224,
236 R

[56] References Cited
UNITED STATES PATENTS

| 853,003 | 5/1907 | Collins | 277/216 |
| Re.23,014 | 7/1948 | Bramberry | 277/216 |
| 2,281,426 | 4/1942 | Farr | 277/236 |

Primary Examiner—Robert I. Smith
Attorney—Walter Becker

ABSTRACT: A split piston ring of pressed and sintered metal powder and method of making the same. The piston ring is characterized primarily in that it has a higher density on its inner periphery than on its outer periphery, while the same density and density distribution prevail on every radial cross-sectional plane.

PATENTED NOV 9 1971 3,618,960

INVENTOR
Max Koehler

By
Walter Becky

PISTON RING

This is a division of my copending application Ser. No. 673,340 filed Oct. 6, 1967 now U.S. Pat. No. 3,561,087.

The invention relates to a split piston ring of internal combustion engines, which is produced by pressing, sintering and recompression of a metal powder having uniform composition, especially an iron powder with additions of graphite and lead and other heavy metals up to several percent which ring has an unvaried cross section along its periphery.

It is known to produce piston rings by powder-metallurgical methods in a manner in which the metal powder is first pressed, then sintered and thereupon recompressed either cold or hot. Recompression can in such an instance take place to such extent that the porosity of the already sintered workpiece is considerably reduced, and the apparent density of the body is thus considerably reduced, and the apparent density of the body is thus considerably increased. The further process steps to which the ring, initially produced in the closed form, is subjected consist in cutting it open, then finishing it, subjecting it to specific improvement treatments, placing it upon the piston and introducing it into the piston groove under stress.

In order that the ring bears tightly against the cylinder walls during operation, it must possess an adequate tangential stress. The invention is based upon the problem of so forming a piston ring produced by powder-metallurigical methods that it is possible to apply to it a tangential stress which is higher than that of the known piston rings produced in this way.

Another packing ring of sintered iron pertaining to the prior art possesses different density and strength at different parts of the cross section, the parts of lower strength and higher deformability possessing a greater cross section. In this case a packing ring is involved which by pressure application from the exterior is partially deformed and fits itself closely to the parts to be sealed. In contrast thereto, the present invention concerns a stress ring in which the seal between piston and cylinder wall is insured by resilient pressure application by the inherent stress of the ring.

Furthermore, piston rings of sintered material are already known in which preferably metallic sintered substances are so distributed that accumulations or stratifications of additional substances are present at the parts which are most highly stressed mechanically and thermally. For example, metal powder of chromium, nickel or vanadium should be added to the iron powder, for example to parts of the ring which are more highly stressed, in order thus to impart specific properties to individual parts of the ring. The production takes place firstly in a manner in which the powder masses pressed into a ring mold are sintered under application of pressure and elevated temperature, or due to the fact that metal powders of different compositions are scattered out by layers on a surface, then discs, strips or rings are cut from the mass and finally introduced into a pressure mold. Such a process is not suitable for the production of a mass-produced article such as a piston ring; on one hand the scattering out of the different kinds of additions onto the parts intended for this purpose would take too much time, on the other hand the power protruding out above the pressure mold when the powder is introduced into the mold, will be stripped away before pressing and, therefore, cannot be used further because its composition is no longer known. A ring produced according to this process has a nonuniform composition along its periphery.

To increase tangential stress, a piston ring produced by pressing, sintering and recompression has also already been so formed that the ring possess different values of the density along its periphery, for example, in that at the part lying opposite to the gap and in the vicinity of the gap a higher density has been given to the ring. Such rings have per se proved their value in practice, but it has proved necessary to increase the tangential stress to still higher values for specific utilization cases, for example, for installation of the ring in high quality engines or the like. The invention is based upon this problem.

It is an object of this invention to provide an improved piston ring.

It is another object of this invention to produce a piston in a powder-metallurgical manner which will withstand a higher tangential stress than heretofore possible.

Surprisingly, it has been found, according to the present invention that the tangential stress which can be imparted to a piston ring of the initially described kind can be substantially increased by the fact that the ring according to the present invention has a higher density on its internal periphery than on its external periphery, while the same density distributing are present on every radial cross-sectional plane.

According to a further feature of the invention, the density can fall linearly or by steps from the internal to the external periphery; in a preferred from of embodiment of the invention it is provided that the density decreases from the internal periphery to about halfway of the wall thickness of the ring and then remains constant as far as the external periphery. Due to the greater compression of the inner zone a ring is obtained which is hard and elastic on its inner side while the porous character of the sintered material is maintained on its outer peripheral zone. The porous sliding surface renders possible a good inherent lubrication, and the strong compression of the inner zone makes it possible to impart an increased tangential stress to the ring, which effects a springing-open after the cutting of the ring.

The invention further concerns a process for the production of such a piston ring, which consists in firstly initially pressing a metal powder mixture into a ring the one annular surface of which rises from the exterior inwardly, in sintering the blank thus produced and so compressing it that it has the same height over the entire wall thickness, and in recompressing the ring then with an appropriately formed press ram in such manner that it has a smaller height on its inner periphery than on its outer periphery, whereupon it is ground to the same intended height, cut, and thermally stressed in known manner.

In a preferred form of embodiment of the invention, in the recompression only the inner zone of the ring up to about half wall thickness is compressed, while the outer zone experiences no compression and remains more porous.

It has proved expedient, according to a further feature of the invention, to carry out the initial pressing and recompression with a bevelled press ram in such manner that the variation of height of the ring after treatment is linear and the angle which the annular surfaces of inclined course assume after initial pressing and recompression in relation to the plane extending perpendicularly of the axis of the ring, amounts to 15°.

The invention further provides initial pressing with a pressure of 35 tons, sintering the blank at a temperature of 1,080° C. after sintering pressing with a pressure of 100 tons, and recompressing with a pressure of 80 tons.

A split piston ring produced according to the above process can have, according to the invention, a density on its inner periphery of 7.5 g./sq.cm., which drops to 6.3 g./sq.cm. at the outer periphery.

The individual production stages of the ring are illustrated in FIGS. 1a to 1d of the drawing.

Firstly, a ring with a final diameter is prepressed in a press mold the bottom ram of which is so formed that the lower annular surface 1 or the blank flares from the inner periphery 3 to the outer periphery 2 at an angle $\alpha$ of 15° (FIG. 1a). In the first compression which takes place after sintering, the ring receives the shape illustrated in FIG. 1b, in which it has the same height over the whole radial cross section. The recompression is carried out with a mold the bottom ram of which is bevelled off rising from the interior at an angle of 15° in such manner that the recompressed ring becomes thicker approximately from the middle of its wall thickness to its outer periphery 2. The angle B which the inclined section 4 of the lower annular surface 1 forms with the plane lying perpendicular to the ring axis should again amount to about 15° (see FIG. 1c). Due to the second recompression the density of the inner zone of the ring has been increased in relation to the zone at its outer periphery. The ring is then ground to its intended height $h$ (FIG. 1d), cut with a milling cutter of the thickness of the intended gap and then thermally stressed. After this treatment, the ring is ready for installation.

EXAMPLE 18 g. of a powder mixture of 1.2 % graphite, 3.0% lead, 3.0% nickel and 92.8% iron powder were pressed with a pressure of 35 tons into a ring having the following dimensions:

External diameter = 85.5 mm.
Internal diameter = 77.6 mm.
External height = 2.5 mm.
Internal height = 3.5 mm. =
Inward rise = 15°

The density of the ring amounted to 6.3 g./sq.cm., the pore volume 12 to 13%.

The blank was then sintered for two hours at a temperature of 1080° C., thereafter the ring weight amounted to 17.9 g. For greater compression of the inner zone, the ring was pressed at a pressure of 100 tons to an externally and internally equal height of 2.5 mm. In the subsequent recompression with a bottom ram bevelled to rise inwardly at 15°, with a pressure of 80 tons a further compression from the wall thickness center to the inner zone, was achieved. Thereafter, the height at the internal periphery of the ring amounted to 2.1 mm. with a density of 7.5 g./sq.cm., which decreased to 6.3 g./sq.cm. to the outer periphery 2.

The ring was then ground to an intended height of 2.0 mm., cut with a milling cutter 0.3 mm. in thickness, and thermally stressed in known manner.

It is, of course to be understood, that the present invention is, by no means, limited to the particular split piston ring and method described above, but also comprises any modifications within the scope of the invention.

What I claim is:

1. A split piston ring of pressed and sintered metal powder of uniform composition and substantially uniform cross section along its periphery, which has a higher density on its inner periphery than on its outer periphery, while the same density and density distribution prevail on every radial cross-sectional plane.

2. A piston ring according to claim 1, in which the density decreases linearly from the inner to the outer periphery.

3. A piston ring according to claim 1, in which the density decreases by stages from the interior in outward direction.

4. A piston ring according to claim 1, in which the density decreases linearly from the inner periphery to approximately half of the wall thickness of the ring, and then remains constant up to the outer periphery.

* * * * *